J. Parce,

Butter Package,

Nº 44,551. Patented Oct. 4, 1864.

Witnesses:
Chas. F. Spencer
Jay Hyatt

Inventor
Justus Parce,
By J. Fraser & Co.
Attys.

UNITED STATES PATENT OFFICE.

JUSTUS PARCE, OF FAIRPORT, NEW YORK.

IMPROVED BOX OR TUB FOR PUTTING UP BUTTER.

Specification forming part of Letters Patent No. 44,551, dated October 4, 1864.

*To all whom it may concern:*

Be it known that I, JUSTUS PARCE, of Fairport, in the county of Monroe and State of New York, have invented a new and useful Improvement in Boxes or Tubs for Packing and Transporting Butter; and I do hereby declare that the following is a full and exact description thereof, reference being had to the accompanying drawings, making part of this specification.

Figure 1:
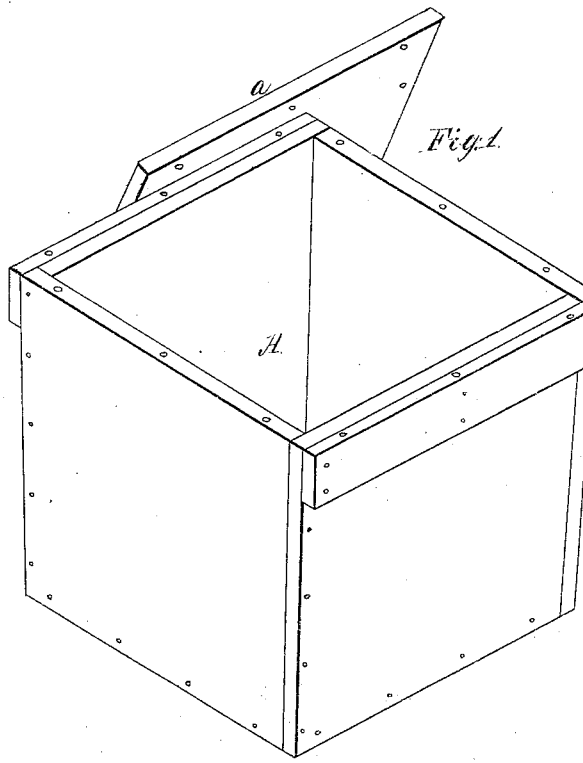
Figure 3:
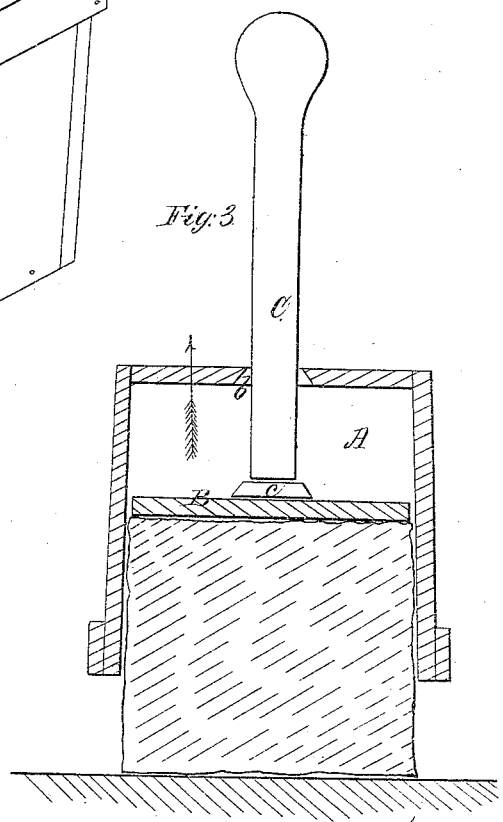
Figure 2:
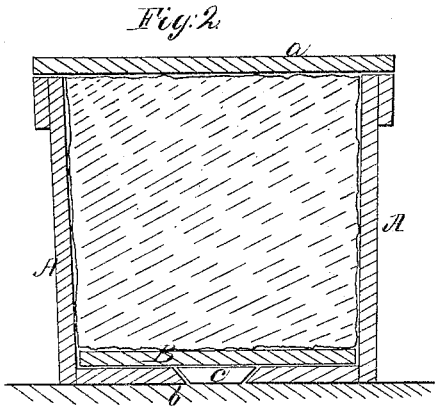

Figure 1 is a perspective view of my improved box with the cover removed; Fig. 2, a central vertical section thereof; Fig. 3, a similar section, but with the box inverted and in the act of being removed from the butter therein.

Like letters of reference indicate corresponding parts in all the figures.

In packing butter and transporting it to market it is usually put into firkins, pails, &c. There are several disadvantages in this. The receptacles are costly, requiring to be made by a cooper. In opening the butter either for inspection or removal the hoops at one end have to frequently be loosened. It is difficult from the form of the receptacle to remove the butter entire, the same not only sticking to the sides of the firkin but also having a tendency to create a vacuum in the rear as it comes out.

To economize in the manufacture of the receptacle, I make it in the form of a cubic or slightly beveled box, A, composed of four sides and a bottom nailed together, and a cover, $a$, on top, screwed or nailed in place so as to be easily removed. In this box at the bottom I place a thin board or leaf, B, which I call a "follower," of such size as to cover the area. Through the bottom of the box I make a hole, $b$, beveling inward, in which fits a stopper, $c$, of the same form, so as not to be forced through outward, and closing the opening. The butter is packed into this box with the follower in the bottom. In order to remove the butter it is necessary only to take off the cover $a$ and invert the box and then place the end of a handle or stick, C, on the stopper $c$ at the top and press on the same sufficiently to hold the butter down while the box is raised vertically, as indicated by the arrow in Fig. 3, the hole $b$ allowing the handle C to pass through. The advantage of this arrangement is that while the follower is of trifling cost, not worth considering, and occupies an insignificant space in the box, I am thereby enabled to remove the butter at once without the vexation and delay consequent in the use of the ordinary receptacle. The tendency to form a vacuum in the rear of the butter is avoided by the opening $b$, which allows the air to pass in after the follower, and thus serves an additional purpose beside that of allowing an entrance to the handle to hold the butter down. This filling of the vacuum insures the removal of the butter more easily. In addition to this the follower, by covering the area of the space of the box, presses the mass of the butter down equally to the very sides of the receptacle, so that not only is the butter cleanly removed and none left sticking to the sides, but when removed the mass presents a regular and unmutilated appearance and not the ragged outline of such as is taken from the ordinary receptacle.

As this box is intended more particularly for transporting butter where no brine is used and where it is required that the butter should remain but a short time, it is not necessary that the receptacle should be very tight.

What I claim as my invention, and desire to secure by Letters Patent, is—

The follower B, in combination with the butter-box A, provided with the opening $b$ in the bottom, substantially as and for the purpose herein set forth.

In witness whereof I have hereunto signed my name in the presence of two subscribing witnesses.

JUSTUS PARCE.

Witnesses:
O. C. BURNHAM,
J. C. ALLEN.